United States Patent
Radi

(10) Patent No.: US 11,934,663 B2
(45) Date of Patent: *Mar. 19, 2024

(54) COMPUTATIONAL ACCELERATION FOR DISTRIBUTED CACHE

(71) Applicant: Western Digital Technologies, Inc., San Jose, CA (US)

(72) Inventor: Marjan Radi, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/571,922

(22) Filed: Jan. 10, 2022

(65) Prior Publication Data

US 2023/0221867 A1  Jul. 13, 2023

(51) Int. Cl.
*G06F 12/00* (2006.01)
*G06F 3/06* (2006.01)
(Continued)

(52) U.S. Cl.
CPC .......... *G06F 3/0619* (2013.01); *G06F 3/0641* (2013.01); *G06F 3/0659* (2013.01);
(Continued)

(58) Field of Classification Search
CPC .... G06F 3/0619; G06F 3/0641; G06F 3/0659; G06F 3/067; G06F 3/0679; G06F 11/1004; G06F 12/084
(Continued)

(56) References Cited

U.S. PATENT DOCUMENTS 8,412,907 B1  4/2013  Dunshea et al.
8,700,727 B1  4/2014  Gole et al.
(Continued)

FOREIGN PATENT DOCUMENTS

CN  106603409 A  4/2017
CN  112351250 A  2/2021
(Continued)

OTHER PUBLICATIONS

Pending U.S. Appl. No. 17/829,712, filed Jun. 1, 2022, entitled "CONTEXT-AWARE NVMe Processing in Virtualized Environments", Marjan Radi.
(Continued)

*Primary Examiner* — Mardochee Chery
(74) *Attorney, Agent, or Firm* — Barry IP Law, P.C.

(57) ABSTRACT

A client device includes at least one memory configured to be used at least in part as a shared cache in a distributed cache. A network interface of the client device is configured to communicate with one or more other devices on a network each configured to provide a respective shared cache for the distributed cache. A Non-Volatile Memory express (NVMe) controller of the client device receives a command from a processor to access data in the shared cache and executes a program to use data read from the shared cache or data to be written to the shared cache to perform at least one computational operation. In another aspect, data is accessed in the shared cache using a kernel and data read from the shared cache or data to be written to the shared cache is used to perform at least one computational operation by the kernel.

20 Claims, 3 Drawing Sheets

(51) Int. Cl.
  *G06F 11/10* (2006.01)
  *G06F 12/084* (2016.01)
(52) U.S. Cl.
  CPC ............ *G06F 3/067* (2013.01); *G06F 3/0679* (2013.01); *G06F 11/1004* (2013.01); *G06F 12/084* (2013.01)
(58) Field of Classification Search
  USPC .......................................................... 711/111
  See application file for complete search history.

(56) References Cited

U.S. PATENT DOCUMENTS

| | | | |
|---|---|---|---|
| 10,362,149 | B2 | 7/2019 | Biederman et al. |
| 10,530,711 | B2 | 1/2020 | Yu et al. |
| 10,754,707 | B2 | 8/2020 | Tamir et al. |
| 10,757,021 | B2 | 8/2020 | Man et al. |
| 11,134,025 | B2 | 9/2021 | Billore et al. |
| 11,223,579 | B2 | 1/2022 | Lu |
| 2014/0143365 | A1 | 5/2014 | Guerin et al. |
| 2015/0006663 | A1 | 1/2015 | Huang |
| 2015/0319237 | A1 | 11/2015 | Hussain et al. |
| 2017/0163479 | A1 | 6/2017 | Wang et al. |
| 2017/0269991 | A1 | 9/2017 | Bazarsky et al. |
| 2018/0191632 | A1 | 7/2018 | Biederman et al. |
| 2018/0341419 | A1 | 11/2018 | Wang et al. |
| 2018/0357176 | A1 | 12/2018 | Wang |
| 2019/0227936 | A1 | 7/2019 | Jang |
| 2019/0280964 | A1 | 9/2019 | Michael et al. |
| 2020/0034538 | A1 | 1/2020 | Woodward et al. |
| 2020/0201775 | A1 | 6/2020 | Zhang et al. |
| 2020/0274952 | A1* | 8/2020 | Waskiewicz ............ H04L 41/24 |
| 2020/0285591 | A1 | 9/2020 | Luo et al. |
| 2020/0322287 | A1 | 10/2020 | Connor et al. |
| 2020/0403905 | A1 | 12/2020 | Allen et al. |
| 2021/0019197 | A1 | 1/2021 | Tamir et al. |
| 2021/0058424 | A1 | 2/2021 | Chang et al. |
| 2021/0149763 | A1 | 5/2021 | Ranganathan et al. |
| 2021/0157740 | A1 | 5/2021 | Benhanokh et al. |
| 2021/0240621 | A1* | 8/2021 | Fu .......................... G06F 12/084 |
| 2021/0266253 | A1 | 8/2021 | He et al. |
| 2021/0320881 | A1 | 10/2021 | Coyle et al. |
| 2021/0377150 | A1 | 12/2021 | Dugast et al. |
| 2022/0035698 | A1 | 2/2022 | Vankamamidi et al. |
| 2022/0294883 | A1* | 9/2022 | Pope .................. H04L 67/1097 |
| 2022/0350516 | A1 | 11/2022 | Bono et al. |
| 2022/0357886 | A1* | 11/2022 | Pitchumani ............ G06F 3/0659 |

FOREIGN PATENT DOCUMENTS

| | | | | |
|---|---|---|---|---|
| EP | 3358456 | A1 * | 8/2018 | ......... G06F 12/0246 |
| EP | 3598309 | B1 | 5/2022 | |
| KR | 1020190090331 | A | 8/2019 | |
| WO | 2018086569 | A1 | 5/2018 | |
| WO | 2018145725 | A1 | 8/2018 | |
| WO | 2021226948 | A1 | 11/2021 | |

OTHER PUBLICATIONS

Tu et al.; "Bringing the Power of eBPF to Open vSwitch"; Linux Plumber 2018; available at: http://vger.kernel.org/pc_net2018_talks/ovs-ebpf-afxdp.pdf.

Pending U.S. Appl. No. 17/836,927, filed Jun. 9, 2022 entitled "Resource Allocation in Virtualized Environments", Marjan Radi.

Pending U.S. Appl. No. 17/850,767, filed Jun. 27, 2022 entitled "Memory Coherence in Virtualized Environments", Marjan Radi.

Pending U.S. Appl. No. 17/741,244, filed May 10, 2022, entitled "In-Kernel Cache Request Queuing for Distributed Cache", Marjan Radi.

Pfaff et al.; "The Design and Implementation of Open vSwitch"; Usenix; May 4, 2015; available at: https://www.usenix.brg/conference/nsdi15/technical-sessions/presentation/pfaff.

Gao et al.; "OVS-CAB: Efficient rule-caching for Open vSwitch hardware offloading"; Computer Networks; Apr. 2021; available at:https://www.sciencedirect.com/science/article/abs/pii/S1389128621000244.

Sabella et al.; "Using eBPF for network traffic analysis"; available at: Year: 2018; https://www.ntop.org/wp-content/uploads/2018/10/Sabella.pdf.

Kang et al.; "Enabling Cost-effective Data Processing with Smart SSD"; 2013 IEEE 29th Symposium on Mass Storage Systems and Technologies (MSST); available at: https://pages.cs.wisc.edu/~yxy/cs839-s20/papers/SmartSSD2.pdf.

maefeichen.com; "Setup the extended Berkeley Packet Filter (eBPF) Environment"; Maofei's Blog; Dec. 9, 2021; available at: https://maofeichen.com/setup-the-extended-berkeley-packet-filter-ebpf-environment/.

International Search Report and Written Opinion dated Oct. 25, 2022 from International Application No. PCT/ US2022/030414, 11 pages.

Baidya et al.; "eBPF-based Content and Computation-aware Communication for Real-time Edge Computing"; IEEE International Conference on Computer Communications (INFOCOM Workshops); May 8, 2018; available at https://arxiv.org/abs/1805.02797.

Barbalace et al.; "blockNDP: Block-storage Near Data Processing"; University of Edinburgh, Huawei Dresden Research Center, Huawei Munich Research Center, TUM; Dec. 2020; 8 pages; available at https://dl.acm.org/ doi/10.1145/3429357.3430519.

Blin et al.; "Toward an in-kernel high performance key-value store implementation"; Oct. 2019; 38th Symposium on Reliable Distributed Systems (SRDS); available at: https://ieeexplore.ieee.org/document/9049596.

Enberg et al.; "Partition-Aware Packet Steering Using XDP and eBPF for Improving Application-Level Parallelism"; ENCP; Dec. 9, 2019; 7 pages; available at: https://penberg.org/papers/xdp-steering-encp19.pdf.

Kicinski et al.; "eBPF Hardware Offload to SmartNICs: cls_bpf and XDP"; Netronome Systems Cambridge, United Kingdom; 2016; 6 pages; available at https://www.netronome.com/media/documents/BPF_HW_OFFLOAD_HNiMne8_2 _.pdf.

Kourtis et al.; "Safe and Efficient Remote Application Code Execution on Disaggregated NVM Storage with eBPF"; Feb. 25, 2020; 8 pages; available at https://arxiv.org/abs/2002.11528.

Wu et al.; "BPF for storage: an exokernel-inspired approach"; Columbia University, University of Utah, VMware Research; Feb. 25, 2021; 8 pages; available at: https://sigops.org/s/conferences/hotos/2021/papers/hotos21-s07-zhong.pdf.

International Search Report and Written Opinion dated Nov. 18, 2022 from International Application No. PCT/US2022/030437, 10 pages.

Ghigoff et al, "BMC: Accelerating Memcached using Safe In-kernel Caching and Pre-stack Processing"; In: 18th USENIX Symposium on Networked Systems Design and Implementation (NSDI 2021); p. 487-501; Apr. 14, 2021.

International Search Report and Written Opinion dated Sep. 30, 2022 from International Application No. PCT/US2022/029527, 9 pages.

Anderson et al.; "Assise: Performance and Availability via Client-local NVM in a Distributed File System"; the 14th USENIX Symposium on Operating Systems Design and Implementation; Nov. 6, 2020; available at: https://www.usenix.org/conference/osdi20/presentation/anderson.

Pinto et al.; "Hoard: A Distributed Data Caching System to Accelerate Deep Learning Training on the Cloud"; arXiv; Dec. 3, 2018; available at: https://arxiv.org/pdf/1812.00669.pdf.

International Search Report and Written Opinion dated Oct. 7, 2022 from International Application No. PCT/US2022/030044, 10 pages.

Bachl et al.; "A flow-based IDS using Machine Learning in EBPF"; Cornell University; Feb. 19, 2021; available at https://arxiv.org/abs/2102.09980.

Caviglione et al.; "Kernel-level tracing for detecting stegomalware and covert channels in Linux environments"; Computer Networks 191; Mar. 2021; available at: https://www.researchgate.net/publication/350182568_Kernel-level_tracing_for_detecting_stegomalware_and_covert_channels_in_Linux_environments.

(56) References Cited

OTHER PUBLICATIONS

Dimolianis et al.; "Signature-Based Traffic Classification and Mitigation for DDOS Attacks Using Programmable Network Data Planes"; IEEE Access; Jul. 7, 2021; available at: https://ieeexplore.ieee.org/stamp/stamp.jsp?arnumber=9511420.

Jun Li; "Efficient Erasure Coding In Distributed Storage Systems"; A thesis submitted in conformity with the requirements for the degree of Doctor of Philosophy Graduate Department of Electrical and Computer Engineering, University of Toronto; Nov. 2017; available at: https://tspace.library.utoronto.ca/bitstream/1807/80700/1/Li_Jun_201711_PhD_thesis.pdf.

Lakshmi J. Mohan; "Erasure codes for optimal performance in geographically distributed storage systems"; Apr. 2018; School of Computing and Information Systems, University of Melbourne; available at: https://minerva-access.unimelb.edu.au/handle/11343/215919.

Navarre et al.; "SRv6-FEC: Bringing Forward Erasure Correction to IPv6 Segment Routing"; SIGCOMM '21: Proceedings of the SIGCOMM '21 Poster and Demo Sessions; Aug. 2021; pp. 45-47; available at: https://dl.acm.org/doi/10.1145/3472716.3472863.

Van Schaik et al.; "RIDL: Rogue In-Flight Data Load"; Proceedings—IEEE Symposium on Security and Privacy; May 2019; available at: https://mdsattacks.com/files/ridl.pdf.

Xhonneux et al.; "Flexible failure detection and fast reroute using eBPF and SRv6"; 2018 14th International Conference on Network and Service Management (CNSM); Nov. 2018; available at: https://dl.ifip.org/db/conf/cnsm/cnsm2018/1570493610.pdf.

Zhong et al.; "Revisiting Swapping in User-space with Lightweight Threading"; arXiv:2107.13848v1; Jul. 29, 2021; available at: https://deepai.org/publication/revisiting-swapping-in-user-space-with-lightweight-threading.

Pending U.S. Appl. No. 17/561,898, filed Dec. 24, 2021, entitled "In-Kernel Caching for Distributed Cache", Marjan Radi.

Pending U.S. Appl. No. 17/665,330, filed Feb. 4, 2022, entitled "Error Detection and Data Recovery for Distributed Cache", Marjan Radi.

Pending U.S. Appl. No. 17/683,737, filed Mar. 1, 2022, entitled "Detection of Malicious Operations for Distributed Cache", Marjan Radi.

Patterson et al.; "Computer Architecture: A Quantitative Approach"; 1996; Morgan Kaufmann; 2nd ed.; pp. 378-380.

Bijlani et al.; "Extension Framework for File Systems in User space"; Jul. 2019; Usenix; available at: https://www.usenix.org/conference/atc19/presentation/bijlani.

Brad Fitzpatrick; "Distributed Caching with Memcached"; Aug. 1, 2004; Linux Journal; available at: https://www.inuxjournal.com/article/7451.

Roderick W. Smith; "The Definitive Guide to Samba 3"; 2004; APress Media; pp. 332-336; available at: https://link.springer.com/book/10.1007/978-1-4302-0683-5.

Wu et al.; "NCA: Accelerating Network Caching with express Data Path"; Nov. 2021; IEEE; available at https://eeexplore.ieee.org/abstract/document/9680837.

* cited by examiner

COMPUTATIONAL ACCELERATION FOR DISTRIBUTED CACHE

CROSS-REFERENCE TO RELATED APPLICATION

This application is related to U.S. application Ser. No. 17/561,898 titled "IN-KERNEL CACHING FOR DISTRIBUTED CACHE", filed on Dec. 24, 2021, which is hereby incorporated by reference in its entirety. This application is also related to U.S. application Ser. No. 17/665,330 titled "ERROR DETECTION AND RECOVERY FOR DISTRIBUTED CACHE", filed on Feb. 4, 2022, which is hereby incorporated by reference in its entirety. This application is also related to U.S. application Ser. No. 17/683,737 titled "DETECTION OF MALICIOUS OPERATIONS FOR DISTRIBUTED CACHE", filed on Mar. 1, 2022, which is hereby incorporated by reference in its entirety.

BACKGROUND

Current trends in cloud computing, big data, and Input/Output (I/O) intensive applications have led to greater needs for high performance distributed shared memory systems in terms of low latency, high throughput, and bandwidth. In addition, the growth of real-time and interactive big data applications with often complex computations relies on fast and high-performance memory. Non-Volatile Memory express (NVMe) is an emerging host controller interface originally designed for Peripheral Component Interface express (PCIe)-based Solid State Drives (SSDs) to provide increased performance in terms of Input/Output Operations Per Second (IOPS). Due to the superior performance of NVMe technology in terms of latency and bandwidth, it is becoming the new industry standard for both client devices and data center servers.

Although NVMe can provide low-latency data access, new hardware and software co-design architectures are generally needed to take full advantage of NVMe and support high-speed remote memory access. In this regard, the increase in bandwidth of network devices, such as network interfaces and switches, has increased the overhead on processors, such as Central Processing Units (CPUs). In addition, CPU-centric architectures may no longer be able to keep up with application demands given the trend towards larger data set sizes.

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed.

DETAILED DESCRIPTION

In the following detailed description, numerous specific details are set forth to provide a full understanding of the present disclosure. It will be apparent, however, to one of ordinary skill in the art that the various embodiments disclosed may be practiced without some of these specific details. In other instances, well-known structures and techniques have not been shown in detail to avoid unnecessarily obscuring the various embodiments.

Example Network Environments

Figure 1:
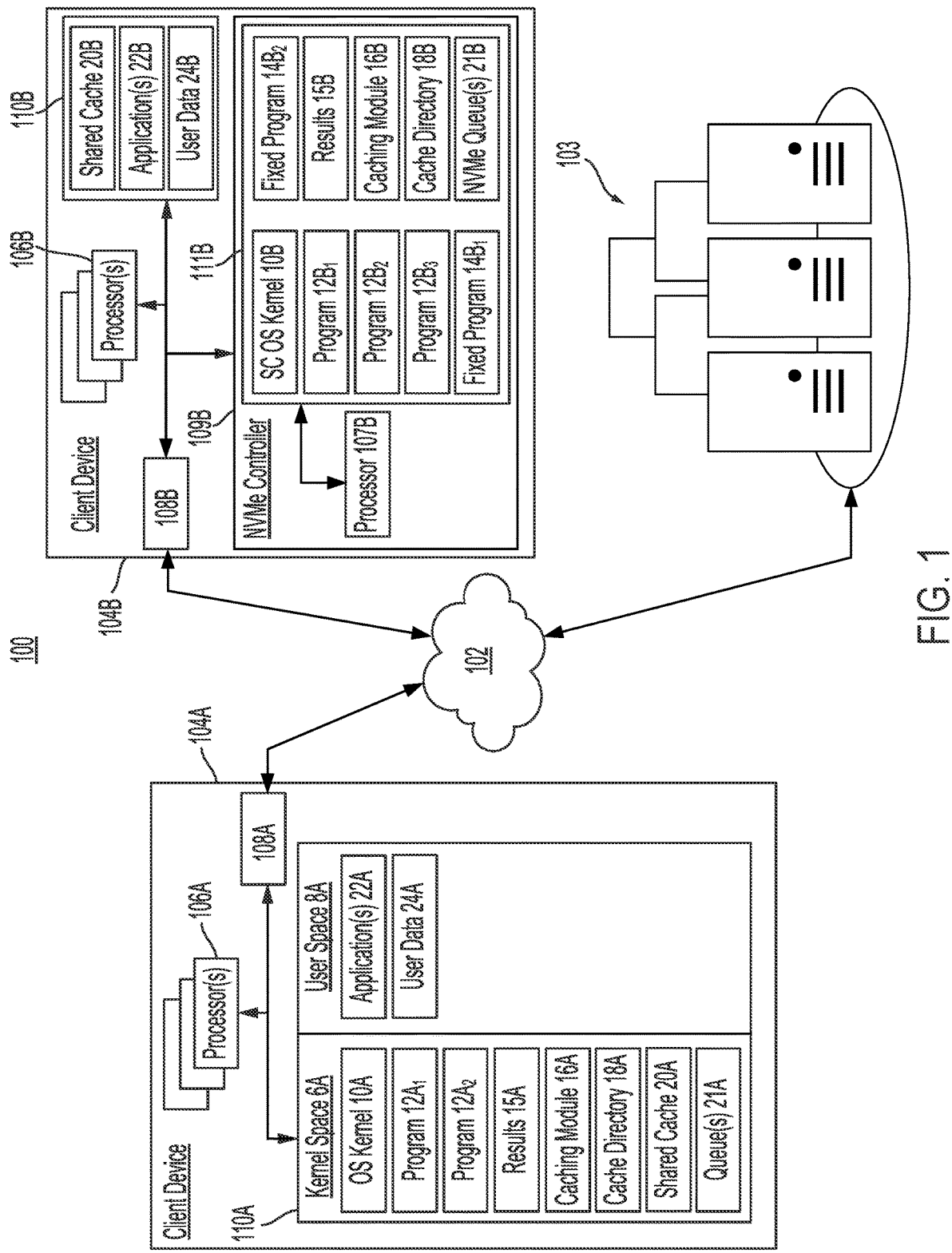
FIG. 1 illustrates an example network environment for implementing computational acceleration for a distributed cache according to one or more embodiments.

FIG. 1 illustrates an example network environment 100 for implementing computational acceleration for a distributed cache according to one or more embodiments. As shown in FIG. 1, client devices 104A and 104B communicate with each other via network 102. In addition, storage devices 103 communicate with client devices 104 via network 102 to provide access to data stored in storage devices 103. Client devices 104 may function as, for example, processing nodes or compute nodes that include one or more processors, such as Reduced Instruction Set Computer (RISC)-V cores or other type of Central Processing Unit (CPU).

Storage devices 103 may function as, for example, storage nodes that store data that can be accessed by client devices 104 and cached locally at client devices 104 as part of a distributed cache. Each storage device of storage devices 103 can include, for example, one or more rotating magnetic disks, and/or non-volatile solid-state memory, such as flash memory. In some implementations, a single storage device 103 may include one or more Solid-State Drives (SSDs) and/or Hard Disk Drives (HDDs). As discussed in more detail below, data retrieved from storage devices 103 or processed by client devices 104 can be cached in respective shared caches 20 at client devices 104 that form a distributed cache to provide faster access to the cached data as compared to retrieving data from storage devices 103.

In some implementations, network environment 100 in FIG. 1 may be used as at least part of a data center and/or for distributed processing, such as for distributed machine learning or big data analysis. As will be appreciated by those of ordinary skill in the art, client devices 104 and storage devices 103 are shown for the purposes of illustration, and network environment 100 can include many more client devices 104 and storage devices 103 than those shown in FIG. 1. In addition, those of ordinary skill the art will appreciate that network environment 100 can include more components than shown in FIG. 1, such as aggregated switches, Top of Rack (ToR) switches, and network controllers, for example.

Network 102 can include, for example, a Storage Area Network (SAN), a Local Area Network (LAN), and/or a Wide Area Network (WAN), such as the Internet. In this regard, client devices 104A, 104B, and storage devices 103 may not be in the same geographic location. Client devices 104 and storage devices 103 may communicate using one or more standards such as, for example, Ethernet.

Each of client devices 104 includes one or more processors 106, a network interface 108, and a memory 110. These components of client devices 104 may communicate with each other via a bus, which can include, for example, a Peripheral Component Interconnect express (PCIe) bus. In some implementations, client devices 104 may include Non-Volatile Memory express over Fabric (NVMeoF) nodes that are configured to communicate with other client devices 104 and storage devices 103 using NVMe messages (e.g., NVMe commands and responses) that may be, for example, encapsulated in Ethernet packets using Transmission Control Protocol (TCP). In this regard, network interfaces 108A and 108B of client devices 104A and 104B, respectively, may include Network Interface Cards (NICs) or can include other network interface devices such as smart NICs, network interface controllers, or network adapters.

In the example of FIG. 1, client device 104B includes NVMe controller 109B for controlling operation of memory 110B, which is an NVMe device. As shown in FIG. 1, NVMe controller 109B includes its own processor 107B and memory 111B. As discussed below, this arrangement can ordinarily improve the performance of client device 104B in offloading one or more different computational operations and/or other operations from a processor 106B of client device 104B to NVMe controller 109B of client device 104B.

Processors 106 and 107B in FIG. 1 can execute instructions, such as instructions from one or more applications (e.g., applications 22) or programs (e.g., programs 12, fixed programs 14B) loaded from a memory 110 or 111C, or from an Operating System (OS) kernel 10. Processors 106 and 107B can include circuitry such as, for example, a CPU, a Graphics Processing Unit (GPU), a microcontroller, a Digital Signal Processor (DSP), an Application-Specific Integrated Circuit (ASIC), a Field Programmable Gate Array (FPGA), one or more RISC-V cores, hard-wired logic, analog circuitry and/or a combination thereof. In some implementations, processors 106 and 107B can include a System on a Chip (SoC), which may be combined with a memory 110 or 111B, respectively.

Memories 110 and 111B can include, for example, a volatile Random Access Memory (RAM) such as Static RAM (SRAM), Dynamic RAM (DRAM), or a non-volatile RAM, or other solid-state memory that is used by processors 106 or 107C. Data stored in memory 110 or memory 111B can include data read from another client device 104 or a storage device 103, data to be stored in another client device 104 or a storage device 103, instructions loaded from an application or from an OS for execution by the processor, and/or data used in executing such applications, such as user data 24.

While the description herein refers to solid-state memory generally, it is understood that solid-state memory may comprise one or more of various types of memory devices such as flash integrated circuits, NAND memory (e.g., Single-Level Cell (SLC) memory, Multi-Level Cell (MLC) memory (i.e., two or more levels), or any combination thereof), NOR memory, EEPROM, other discrete Non-Volatile Memory (NVM) chips, or any combination thereof. In other implementations, memory 110 or 111B may include a Storage Class Memory (SCM), such as, Chalcogenide RAM (C-RAM), Phase Change Memory (PCM), Programmable Metallization Cell RAM (PMC-RAM or PMCm), Ovonic Unified Memory (OUM), Resistive RAM (RRAM), Ferroelectric Memory (FeRAM), Magnetoresistive RAM (MRAM), 3D-XPoint memory, and/or other types of solid-state memory, for example.

Memory 110A of client device 104A includes a kernel space 6A that is used by OS kernel 10A and a user space 8A that is used by one or more applications 22A, such as for accessing user data 24A. Kernel space 6A and user space 8A can include separate portions of virtual memory mapped to physical addresses in memory 110A. As will be understood by those of ordinary skill in the art, access to kernel space 6A is generally restricted to OS kernel 10A, its kernel extensions, and other portions of an OS, such as device drivers, while access to user space 8A is available to both applications 22A and the OS. In this regard, the OS of client device 104A or the OS of NVMe controller 109B allocates hardware and software resources, such as memory, network, and processing resources of the device.

As shown in FIG. 1, kernel space 6A includes programs $12A_1$ and $12A_2$, results 15A, caching module 16A, cache directory 18A, shared cache 20A, and one or more command queues 21A. In implementations where the OS of client device 104A is Linux, programs 12A and caching module 16A can include extended Berkeley Packet Filter (eBPF) programs that are executed as an extension of the Linux kernel. Notably, eBPF can enable reprogramming of the kernel behavior without requiring changes to the kernel source code or loading a kernel module. In addition, eBPF includes a verifier to ensure safe execution of eBPF programs. The use of programs 12A can enable a user defined operation to be performed on data read from shared cache 20A or on data to be written to shared cache 20A.

In the example of FIG. 1, caching module 16A can enable OS kernel 10A to access data for the distributed cache in shared cache 20A that is stored in kernel space 6A, as opposed to user space 8A. As discussed in related co-pending application Ser. No. 17/561,898, which is incorporated by reference above, frequently accessed data can be stored in shared cache 20A using caching module 16A to accelerate remote memory operations at a nearly line rate without requiring special hardware or changes to the kernel in the case where caching module 16A is an eBPF program. The remote memory operations, such as read requests and write requests, can be processed at an earlier point in the kernel, as opposed to having to traverse a full network stack and full I/O stack of the kernel to finally be handled by an application in user space 8A. For example, caching module 16A may operate at a lower block device driver layer in the I/O stack, without having to pass memory requests through higher layers in the I/O stack, such as a generic block layer and file system layer of the kernel. Similarly, caching module 16A may also operate at a lower network device driver layer in the network stack, without having to pass memory requests through higher layers of the network stack in the kernel, such as a network protocol layer and a socket layer of the kernel.

In this regard, kernel network and I/O stack processing is becoming more of a bottleneck in distributed caches due to faster interface standards, such as NVMeOF, and the increasing bandwidths of network hardware. Caching data for the distributed cache in kernel space 6A and performing computational operations in kernel space 6A can enable OS kernel 10A to respond quicker on behalf of user space applications 22A. Although there is some development in allowing user space applications to bypass the kernel and have direct access to storage or memory devices, such as NVMe devices, such performance improvements will come at the cost of reimplementing complicated default kernel functions in user space. In contrast, the in-kernel computational operations of the present disclosure can use a kernel extension, such as an eBPF program, that is added to or injected into the kernel without requiring changes to the kernel source code or reloading a kernel module.

Each of programs $12A_1$ and $12A_2$ can be executed by OS kernel 10A to perform different computational operations on data read from shared cache 20A or data written to shared cache 20A without involving applications 22A in user space 8A, thereby accelerating the performance of such computational operations that would otherwise involve transferring data through the full I/O stack and full network stack of the kernel. In some cases, caching module 16A in kernel space 6A can call or initiate programs 12A to perform computational operations that would otherwise be performed by one or more applications 22A in user space 8A. In other implementations, programs 12A can be called or initiated by an application 22A in user space 8A to offload computational operations from the application 22A to the OS kernel 10A operating in kernel space 6A, which can reduce the amount of data that would otherwise need to traverse the full I/O stack and full network stack of the kernel.

Programs $12A_1$ and $12A_2$ can provide computational operations for storage services, such as, for example, applying a datastore filter to select a subset of data read from shared cache 20A, performing erasure coding on data to be stored in shared cache 20A or read from shared cache 20A, performing error correction on data to be stored in shared cache 20A or read from shared cache 20A, performing a read-modify operation on data read from shared cache 20A, such as updating a portion of the data read from the shared cache, performing a hash function on data read from shared cache 20A or to be written to shared cache 20A, such as for indexing the data in a cache directory (e.g., a Key Value Store (KVS)) or for error detection, and performing a Cyclic Redundancy Check (CRC) calculation on data read from shared cache 20A or to be written to shared cache 20A for error detection. In some implementations, programs $12A_1$ and/or $12A_2$ can be used by the kernel to perform operations particular to NVMe, such as NVMe discovery, NVMe connection setup, and NVMe connection teardown.

In addition, programs $12A_1$ and/or $12A_2$ can be used by the kernel to perform command scheduling operations in some implementations. For example, such a command scheduling operation may order commands in a command queue 21 for performance based at least in part on a priority or Quality of Service (QoS) indicator for the command. For example, a program 12A may identify a priority field of a command, such as an 802.1Q tag in an Ethernet header as part of the IEEE 802.1Qbb Priority-based Flow Control (PFC) standard, and use this priority field to arrange the order of commands in a command queue 21A for performance or may add commands with a higher priority to a separate higher priority command queue 21A that is dequeued for performance of its commands more frequently than another command queue 21A.

Programs $12A_1$ and/or $12A_2$ can also be used by the kernel in some implementations to perform computational operations for a memory service, such as, for example, compression of data to be written in shared cache 20A, decompression of data read from shared cache 20A, encryption of data to be written in shared cache 20A, decryption data read from shared cache 20A, scatter-gather operations for storing data in different locations in shared cache 20A or reading data from different locations in shared cache 20A, and a data deduplication process for data read from shared cache 20A or data to be written to shared cache 20A.

In the example of FIG. 1, shared cache 20A can be used by caching module 16A to share data between kernel space 6A and user space 8A. In some implementations, shared cache 20A can include one or more eBPF maps that allow copies of data to be provided to applications 22A in user space 8A and to store data from applications 22A. Shared cache 20A can include a data structure, such as a KVS or a table, for example. The use of an eBPF map as shared cache 20A can enable different applications 22A in a user space 8A to concurrently access the data stored in the shared cache.

Results 15A can include results from computational operations performed by programs 12A. In some implementations, a result stored in results 15A can be used as an input for a next stage in multiple stages of computational operations performed by programs 12A. For example, data may be read from shared cache 20A in response to a read command received from a processor 106A or from another device on network 102, such as from client device 104B. The data read from shared cache 20A may then be used for a computational operation performed by program $12A_1$, such as error correction of the read data. The result of the error correction may be stored in results 15A, and program $12A_2$ may use this result to perform a second stage of computational operation, such as erasure coding the error corrected data, before the data is returned to the processor 106A or other device on network 102.

Cache directory 18A can include a data structure or listing of logical addresses or NVMe namespace IDs for data stored in the distributed cache. As discussed in more detail in related co-pending application Ser. No. 17/561,898 incorporated by reference above, one or more cache directories can be used by caching module 16A to track information about a status or state of data in the distributed cache, such as a right of access, validity, or permission level for the cached data. Cache directory 18A may also be implemented as one or more eBPF maps and can include a data structure, such as a KVS or table.

One or more command queues 21A can indicate pending commands, such as commands to write or read data from memory 110A and/or shared cache 20A. In some implementations, an application 22A in user space 8A may determine not to offload a computational operation to a program 12A in kernel space 6A if the number of pending commands in a command queue 21A is greater than or equal to a threshold number of commands to allow OS kernel 10A to have more resources to perform the pending commands. In addition, a QoS or priority of an application 22A may affect whether a command is offloaded from the application 22A. For example, an application for a video service may have a lower threshold number of commands in a command queue 21A for offloading a computational operation to a program 12A in the kernel space.

Client device 104B differs from client device 104A in the example of FIG. 1 in that client device 104B includes NVMe controller 109B for controlling operation of memory 110B. As shown in FIG. 1, NVMe controller 109B includes its own processor 107B and memory 111B that are used as a hardware offload from processors 106B for computational operations related to the distributed cache and the data accessed in shared cache 20B. This arrangement can further improve the performance of client device 104B by freeing up processing resources and memory for processors 106B.

NVMe controller 109B can include, for example, an SoC that includes both processor 107B and memory 111B. In the example of client device 104B, NVMe controller 109B includes its own Storage Controller (SC) OS kernel 106 that allocates resources of NVMe controller 109B and memory 110B. In some implementations, memory 110B is an NVMe memory device that stores shared cache 20B for the distributed cache in a kernel space of memory 110B and stores one or more applications 22B and user data 24B in a user space of memory 110B.

Each of programs $12B_1$, $12B_2$, and $12B_3$, fixed programs $14B_1$ and $14B_2$, results 15B, caching module 16B, cache directory 18B, and one or more NVMe command queues 21B can be stored in a kernel space of memory 111B. In implementations where the SC OS 106 is Linux, programs 12B and caching module 16B can include eBPF programs that are executed as an extension of the Linux kernel. The use of programs 12B can enable a user defined operation to be performed on data read from shared cache 20B or on data to be written to shared cache 20B.

Each of programs $12B_1$, $12B_2$ $12B_3$, and fixed programs $14B_1$ and $14B_2$ can be executed by SC OS kernel 10B to perform different computational operations on data read from shared cache 20B or data written to shared cache 20B without involving applications 22B in user space, thereby accelerating the performance of such computational operations that would otherwise involve transferring data through the full I/O stack and full network stack of the kernel. In some cases, caching module 16B executed in kernel space by processor 107B can call or initiate programs 12B and fixed programs 14B to perform computational operations that would otherwise be performed by one or more applications 22B executed in user space by one or more processors 106B. In other cases, programs 12B can be called or initiated by an application 22B in user space to offload computational operations from the application 22B to the SC OS kernel 106 operating in kernel space, which offloads the processing from one or more processors 106B to processor 107B of NVMe controller 109B and also reduces the amount of data that would otherwise need to traverse the full I/O stack and full network stack of an OS kernel of client device 104B.

Shared cache 20B can be used by caching module 16B to share data between a kernel space and a user space. In some implementations, shared cache 20B can include one or more eBPF maps that allow copies of data to be provided to applications 22B in user space and to store data from applications 22B. Shared cache 20B can include a data structure, such as a KVS or a table, for example. The use of an eBPF map as shared cache 20B can enable different applications 22B in a user space to concurrently access the data stored in the shared cache.

As with programs $12A_1$ and $12A_2$ discussed above for client device 104A, programs $12B_1$, $12B_2$, and $12B_3$ can provide computational operations for storage services, such as, for example, applying a datastore filter to select a subset of data read from shared cache 20B, performing erasure coding on data to be stored in shared cache 20B or read from shared cache 20B (e.g., XOR operations), performing error correction on data to be stored in shared cache 20B or read from shared cache 20B, performing a read-modify operation on data read from shared cache 20B, such as updating a portion of the data read from the shared cache, performing a hash function on data read from shared cache 20B or to be written to shared cache 20B, such as for indexing the data in a cache directory (e.g., a KVS) or for error detection, and performing a CRC calculation on data read from shared cache 20A or to be written to shared cache 20A for error detection. In some implementations, programs $12B_1$, $12B_2$, and $12B_3$ can be used by SC OS kernel 10B to perform operations particular to NVMe, such as NVMe discovery, NVMe connection setup, and NVMe connection teardown. In addition, programs $12A_1$ and/or $12A_2$ can be used by the kernel to perform command scheduling operations in some implementations, such as to order the commands in an NVMe command queue 21B or to determine which NVMe command queue 21B a particular command should be enqueued based on a priority indication for the command or for an application that issued the command.

Fixed programs $14B_1$ and $14B_2$ can provide predefined computational operations for a memory service provided by NVMe controller 109B. Such memory services can include, for example, compression of data to be written in shared cache 20B, decompression of data read from shared cache 20B, encryption of data to be written in shared cache 20B, decryption data read from shared cache 20B, scatter-gather operations for storing data in different locations in shared cache 20B or reading data from different locations in shared cache 20B, and a data deduplication process for data read from shared cache 20B or data to be written to shared cache 20B.

Results 15B can include the results from computational operations performed by programs 12B and/or fixed programs 14B. In some implementations, a result stored in results 15B can be used as an input for a next stage in multiple stages of computational operations performed by programs 12B and/or fixed programs 14B. For example, data may be read from shared cache 20B in response to a read command received from a processor 106B or from another device on network 102, such as from client device 104A. The data read from shared cache 20B may then be used for a computational operation performed by fixed program $14B_1$, such as decompression of the read data. The result of the decompression may be stored in results 15B, and program $12B_1$ may use this result to perform a second stage of computational operation, such as error correction of the decompressed data, and the result of the second stage of computation may be stored in results 15B. The result of the error correction may then be used as an input for a third stage of computation, such as performing erasure coding on the decompressed and error corrected data before the data is returned to the processor 106B or other device on network 102.

As another example, a write command may be received by NVMe controller 109B from a processor 106B or from another device on network 102, such as from client device 104A. The data to be written to shared cache 20B may then be used for a computational operation performed by $12B_2$, such as error detection, and the result stored in results 15B. The result may then be used as an input for a second stage of computation performed by fixed program $14B_1$ to compress the data and the compressed data can be stored as a result in results 15B. The compressed data may then be used as an input for a third stage of computation, such as a computational operation performed by fixed program $14B_2$ to encrypt the compressed data before it is written to shared cache 20B using caching module 16B.

Cache directory 18B can include a data structure or listing of logical addresses or NVMe namespace IDs for data stored in the distributed cache. Caching module 16B can use cache directory 18B to track information about a status or state of data in the distributed cache, such as a right of access or permission level for the cached data. Cache directory 18B may also be implemented as one or more eBPF maps and can include a data structure, such as a KVS or table.

One or more NVMe command queues 21B can indicate pending NVMe commands to be performed by NVMe controller 109B, such as commands to write or read data from shared cache 20B. In some implementations, an application 22B in user space may determine not to offload a computational operation to a program 12B or fixed program 14B in kernel space if the number of pending NVMe commands in an NVMe command queue 21B is greater than or equal to a threshold number of commands to allow NVMe controller 109B to have more resources to perform the pending NVMe commands. In addition, a QoS or priority of an application 22B may affect whether a command is offloaded from the application 22B. In some implementations, a device driver or other interface executed by a processor 106B may receive acknowledgments or other information from NVMe controller 109B concerning the completion of commands by NVMe controller 109B and/or the status of NVMe command queues 21B.

Those of ordinary skill in the art will appreciate with reference to the present disclosure that other implementations may include a different number or arrangement of client devices 104 and storage devices 103 than shown in the example of FIG. 1. In this regard, network environment 100 shown in FIG. 1 is for the purposes of illustration, and those of ordinary skill in the art will appreciate that network environment 100 may include many more client devices 104, storage devices 103, and additional components, such as routers and switches, than shown in the example of FIG. 1. In addition, those of ordinary skill in the art will appreciate with reference to the present disclosure that the modules, programs, and data structures shown in FIG. 1 may differ in other implementations. For example, client device 104A or NVMe controller 109B can include a different number of programs 12 or fixed programs 14 than shown in FIG. 1. As another example variation, a shared cache 20 and a cache directory 18 at a client device 104 may be combined in some implementations into a single data structure.

Example Processes

Figure 2:
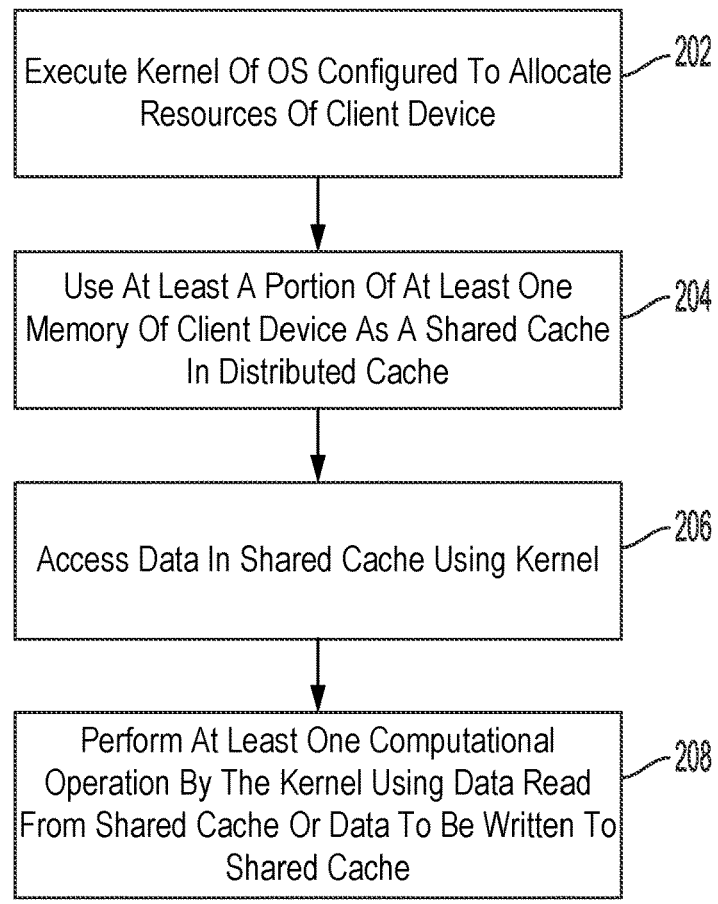
FIG. 2 is a flowchart for an in-kernel computation process according to one or more embodiments.

FIG. 2 is a flowchart for an in-kernel computation process according to one or more embodiments. The process of FIG. 2 may be performed by, for example, processor 106A of client device 104A or processor 107B of NVMe controller 109B in FIG. 1.

In block 202, a kernel of an OS is executed by a processor to allocate resources of a client device. In implementations where the processor executes an OS for an NVMe controller (e.g., SC OS 10B in FIG. 1), the processor may use the OS to allocate resources of the NVMe controller and the memory or storage that it controls.

In block 204, at least a portion of at least one memory of a client device is used as a shared cache in a distributed cache (e.g., shared cache 20A or 20B in FIG. 1). The distributed cache can include respective shared caches of other devices on a network.

In block 206, the processor uses the kernel to access or cache data for a distributed cache in a kernel space of at least one memory of the client device (e.g., a shared cache 20 in FIG. 1). As used herein, accessing data can include reading, modifying, and writing data. A kernel extension (e.g., an eBPF program) may use one or more data structures (e.g., one or more eBPF maps) in a kernel space of a memory that is reserved for the OS. The kernel or kernel extension can then share the data cached in the data structure with user applications that operate in a user space of the client device or the network interface. Those of ordinary skill in the art will appreciate with reference to the present disclosure that the execution of the OS kernel in block 202 and use of at least a portion of at least one memory of a client device in block 204 overlaps with the accessing of data in block 206.

In this regard, using the kernel for caching data in a distributed cache reduces the overhead on the processor by not having to pass all remote memory messages from other network devices (e.g., read requests, write requests, permission requests, cache directory updates, acknowledgments, discovery requests) through the full network stack and full I/O stack of the kernel and to applications in the user space. The response time to remote memory requests or processing time for remote memory messages is significantly improved since the memory requests and messages can be processed at a much earlier point in the kernel.

In block 208, the processor performs at least one computational operation by the kernel using data read from the shared cache or data to be written to the shared cache. As noted above, performance of computational operations on the accessed data can be accelerated by using programs in the kernel space, as opposed to applications in the user space. The kernel in block 206 can implement a program, such as an eBPF program or a fixed program to perform one or more computational operations on the data read from or on data to be written to the shared cache.

One or more eBPF programs may be used, for example, to apply a datastore filter to select a subset of data read from the shared cache, perform erasure coding on data to be stored in the shared cache or read from the shared cache (e.g., XOR operations), perform error correction on data to be stored in the shared cache or read from the shared cache, perform a read-modify operation on data read from the shared cache, such as updating a portion of the data read from the shared cache, perform a hash function on data read from the shared cache or to be written to the shared cache, such as for indexing the data in a cache directory (e.g., a KVS) or for error detection, and perform a CRC calculation on data read from the shared cache or to be written to the shared cache for error detection.

Alternatively or additionally, one or more fixed programs may be used, for example, to compress data to be written in the shared cache, decompress data read from the shared cache, encrypt data to be written in the shared cache, decrypt data read from the shared cache, perform scatter-gather operations for storing data in different locations in the shared cache or read data from different locations in the shared cache, and perform a data deduplication process for data read from the shared cache or data to be written to the shared cache, such as determining not to write data that would be a duplicate of data already stored in the shared cache.

The response and processing time for remote memory requests and computational operations can be further reduced where access to the shared memory for the distributed cache is provided by a kernel of an NVMe controller of a client device. In this regard, one or more eBPF programs can be added to the kernel of an OS of the NVMe controller to enable a transparent offload of computational operations from the main processor and/or main memory of the client device to the processor and/or memory of the NVMe controller. Such offloading to an NVMe controller can further reduce the workload or overhead on the client device's main processor (e.g., CPU) to improve the performance or scheduling of tasks for applications executing in user space.

Those of ordinary skill in the art will appreciate with reference to the present disclosure that the blocks for the in-kernel computation process of FIG. 2 may differ in other implementations. For example, blocks 202, 204, and 206 may be performed concurrently.

Figure 3:
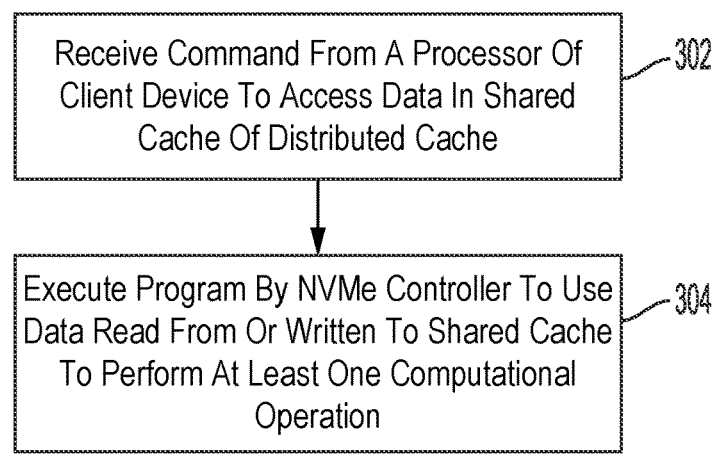
FIG. 3 is a flowchart for a computation process performed by a Non-Volatile Memory express (NVMe) controller according to one or more embodiments.

FIG. 3 is a flowchart for a computation process performed by a NVMe controller, such as NVMe controller 109B in FIG. 1, according to one or more embodiments.

In block 302, a command is received from a processor of a client device (e.g., a processor 106B in FIG. 1) to access data in a shared cache of a distributed cache. In some implementations, a user space application executed by the processor of the client device may issue commands to the NVMe controller by referencing a slot number that runs a particular eBPF program or fixed program at the NVMe controller. In some cases, the application in the user space may use opportunistic scheduling to determine if there are sufficient hardware resources available or that a number of pending commands in an NVMe queue is less than or equal to a threshold number of commands before sending the command to the NVMe controller.

In another aspect, the user space application may take advantage of user space information about tasks to determine if such tasks should be offloaded to the NVMe controller. For example, the user space application may have information that a first computational operation and a second computational operation can successfully run concurrently. The user space application may then determine to offload both computational operations to the NVMe controller based on this information.

In block 304, the NVMe controller or a processor of the NVMe controller (e.g., processor 107B in FIG. 1) executes a program, such as an eBPF program or fixed program, to use data read from or written to the shared cache to perform at least one computational operation. As discussed above, the computational operation may be a first stage of computation of multiple stages of computational operations with intermediate data or results being stored in a kernel space of a memory of the client device. In addition, those of ordinary skill in the art will appreciate with reference to the present disclosure that different commands may be received from a processor or other device on the network that result in different programs and different computational operations being performed on data accessed in the shared cache.

Figure 4:
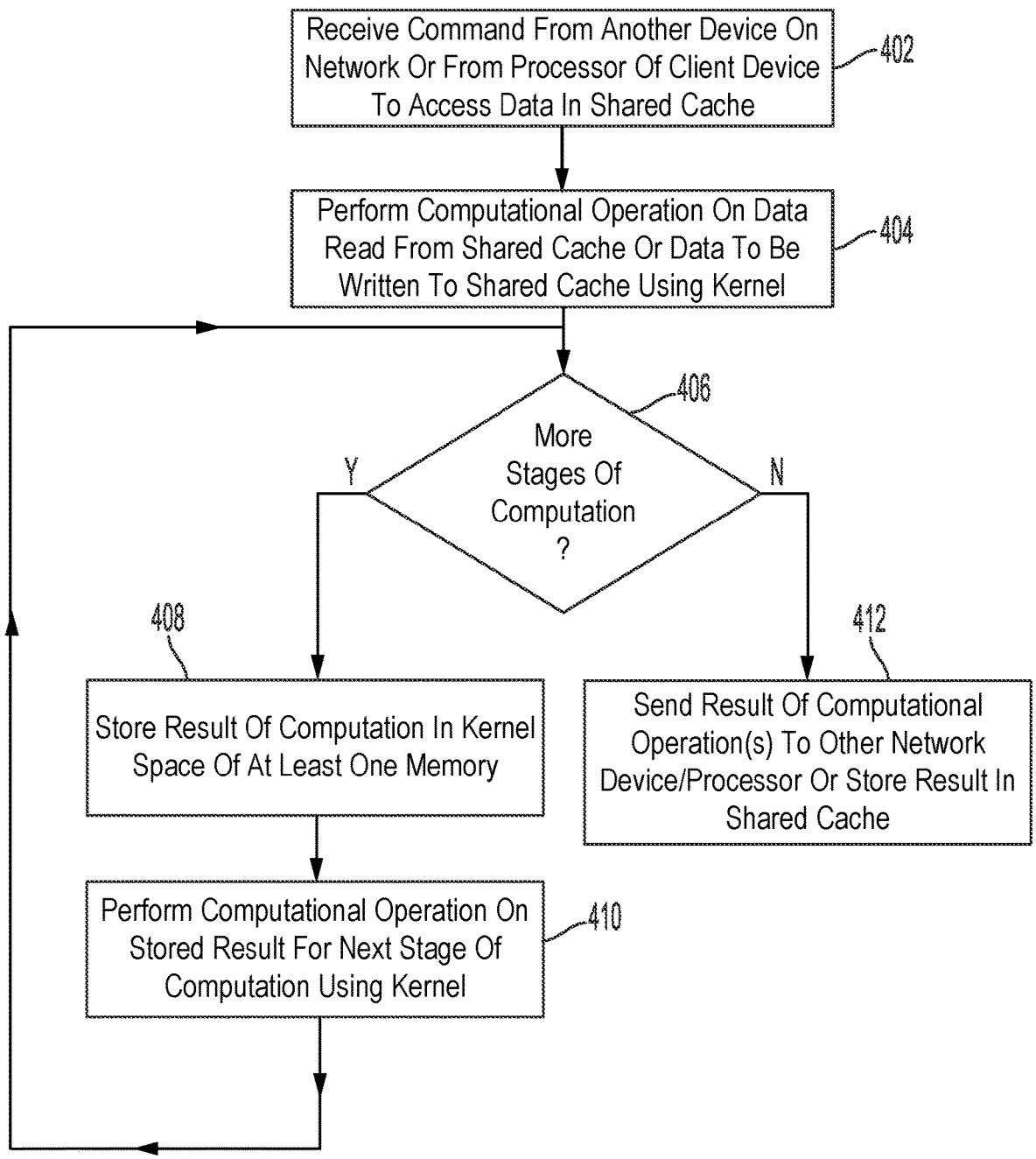
FIG. 4 is a flowchart for a multi-stage computation process according to one or more embodiments.

FIG. 4 is a flowchart for a multi-stage computation process according to one or more embodiments. The process of FIG. 4 may be performed by, for example, a processor 106A of client device 104A or processor 107B of NVMe controller 109B in FIG. 1.

In block 402, the processor receives a command from another device on a network or from a processor of a client device to access data in a shared cache of the client device. The command can include, for example, a write command to write data to the shared cache or a read command to read data from the shared cache. In other cases, the received command can be to modify the data stored in the shared cache.

In block 404, the processor performs a computational operation on data for the command using a kernel of the client device. With reference to the example of FIG. 1, the computational operation may be performed by a program that is an extension to the kernel, such as an eBPF program of OS kernel 10A or an eBPF program or fixed program of OS kernel 10B. The data for the command includes data read from the shared cache or data to be written to the shared cache that can be accessed by a caching module (e.g., caching modules 16A or 16B in FIG. 1) executed by the kernel.

In block 406, the processor determines whether there are more stages of computation for the data accessed in the shared cache. In determining whether there are more stages of computation, the processor may follow a set order of computational operations for data read from the shared cache and a set order of computational operations for data to be written to the shared cache. In some implementations, the order of computational operations can be determined by a caching module of the kernel. In other cases, whether there are more stages of computation can depend on the result from the computational operation performed in block 404, such as whether a datastore filtering operation finds a match in the shared cache.

If it is determined in block 406 that there are more stages of computation, the processor in block 408 stores the result of the computational operation performed in block 404 in a kernel space of at least one memory of the client device (e.g., results 15 in FIG. 1). A kernel space reserved for intermediate results can be used in some implementations as a scratchpad or temporary storage location for data that is to be modified.

In block 410, a computational operation is performed on the result stored in block 408 for a next stage of computation using the kernel. The computational operation for the next stage may be performed, for example, by a different program executed by the kernel than the program used by the kernel in performing the previous stage of computation. The process of FIG. 4 returns to block 406 to determine if there are more stages of computation.

If it is determined that there are not more stages of computation in block 406, the processor in block 412 sends the result of the last computational operation to another network device or other processor of the client device or may store the result in the shared cache. The sending or storing of the result in block 412 can be responsive to the command received in block 402 in that the result may be sent to the device or processor that issued a read command or the result may be stored in the shared cache if the command received in block 402 was a write command to store or modify data in the shared cache.

As discussed above, the foregoing use of in-kernel computational operations for a distributed cache can reduce the latency in accessing and modifying data since the data does not need to be processed through the full network and I/O stacks of the kernel and then processed by an application in the user space. In addition to reducing the latency for the distributed cache, the foregoing use of in-kernel computational operations can also reduce the workload or overhead on a processor (e.g., CPU) of the client device, such as when the computational operations are offloaded to an NVMe controller, and by requiring less interactions between the kernel space and the user space.

Other Embodiments

Those of ordinary skill in the art will appreciate that the various illustrative logical blocks, modules, and processes described in connection with the examples disclosed herein may be implemented as electronic hardware, computer software, or combinations of both. Furthermore, the foregoing processes can be embodied on a computer readable medium which causes processor or controller circuitry to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, modules, processor circuitry, and controller circuitry described in connection with the examples disclosed herein may be implemented or performed with a general purpose processor, a GPU, a DSP, an ASIC, an FPGA or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. Processor or controller circuitry may also be implemented as a combination of computing devices, e.g., a combination of a DSP and a microprocessor, a plurality of microprocessors, an SoC, one or more microprocessors in conjunction with a DSP core, or any other such configuration.

The activities of a method or process described in connection with the examples disclosed herein may be embodied directly in hardware, in a software module executed by processor or controller circuitry, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable media, an optical media, or any other form of storage medium known in the art. An exemplary storage medium is coupled to processor or controller circuitry such that the processor or controller circuitry can read information from, and write information to, the storage medium. In the alternative, the storage medium may be integral to processor or controller circuitry. The processor or controller circuitry and the storage medium may reside in an ASIC or an SoC.

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the spirit or scope of the present disclosure. The described embodiments are to be considered in all respects only as illustrative and not restrictive. In addition, the use of language in the form of "at least one of A and B" in the following claims should be understood to mean "only A, only B, or both A and B."

What is claimed is:

1. A client device, comprising:
   at least one memory configured to be used at least in part as a shared cache that forms part of a distributed cache on a network;
   a processor;
   a network interface configured to communicate with one or more other devices on the network, the one or more other devices each configured to provide a respective shared cache for the distributed cache; and
   a Non-Volatile Memory express (NVMe) controller configured to:
   execute an Operating System (OS);
   receive a command from the processor to access data in the shared cache; and
   in response to receiving the command, execute a program to use data read from the shared cache or data to be written to the shared cache to perform at least one computational operation in a kernel space of the OS.

2. The client device of claim 1, wherein the network interface is further configured to communicate with the one or more other devices on the network using NVMe Over Fabric (NVMeOF).

3. The client device of claim 1, wherein the program executed by the NVMe controller is an extended Berkeley Packet Filter (eBPF) program.

4. The client device of claim 1, wherein the NVMe controller is further configured to:
   receive a different command from the processor to access data in the shared cache; and
   in response to receiving the different command, execute a different program to use data read from the shared cache or data to be written to the shared cache to perform at least one different computational operation.

5. The client device of claim 1, wherein the NVMe controller is further configured to receive the command from the processor to access data in the shared cache via an internal bus of the client device.

6. The client device of claim 1, wherein the NVMe controller is further configured to store a result from the computational operation in the kernel space.

7. The client device of claim 1, wherein:
   the computational operation is a first stage of computation in a plurality of stages of computations; and
   the client device further comprises means for using a result from the computational operation as an input for a second stage of computation in the plurality of stages.

8. The client device of claim 1, wherein the computational operation includes at least one of compression of the data, decompression of the data, encryption of the data, decryption of the data, a scatter-gather operation for the data, and a data deduplication process for the data.

9. The client device of claim 1, wherein the computational operation includes at least one of using a datastore filter on the data, performing erasure coding on the data, performing error correction on the data, performing a read-modify operation on the data, performing a hash function on the data, and performing a Cyclic Redundancy Check (CRC) calculation on the data.

10. The client device of claim 1, wherein the processor is configured to identify one or more tasks to offload to the NVMe controller via the command based on information about the one or more tasks.

11. The client device of claim 1, wherein the processor is configured to:
    determine a status of an NVMe command queue; and
    determine whether to send a different command to the NVMe controller to offload a computational operation to the NVMe controller based on the status of the NVMe command queue.

12. A method, comprising:
    executing, by a client device, a kernel of an Operating System (OS) configured to allocate resources of the client device;
    using at least a portion of at least one memory of the client device as a shared cache in a distributed cache, wherein the distributed cache includes respective shared caches of one or more other devices on a network;
    accessing data in the shared cache using the kernel; and
    using the data accessed in the shared cache to perform at least one computational operation by the kernel.

13. The method of claim 12, wherein the data is accessed in the shared cache in response to an NVMe Over Fabric (NVMeOF) command received from another device on the network.

14. The method of claim 12, wherein the kernel performs the at least one computational operation by executing an extended Berkeley Packet Filter (eBPF) program.

15. The method of claim 12, further comprising:
    receiving a command from another device on the network to access data in the shared cache; and
    in response to receiving the command, using data read from the shared cache or data to be written to the shared cache by performing at least one different computational operation by the kernel.

16. The method of claim 12, further comprising storing a result from the computational operation in a kernel space of the at least one memory.

17. The method of claim 12, wherein:
the computational operation is a first stage of computation in a plurality of stages of computations; and
the method further comprises using a result from the computational operation as an input for a second stage of computation in the plurality of stages.

18. The method of claim 12, wherein the computational operation includes at least one of compression of the data, decompression of the data, encryption of the data, decryption of the data, a scatter-gather operation for the data, and a data deduplication process for the data.

19. The method of claim 12, wherein the computational operation includes at least one of using a datastore filter on the data, performing erasure coding on the data, performing error correction on the data, performing a read-modify operation on the data, performing a hash function on the data, and performing a Cyclic Redundancy Check (CRC) calculation on the data.

20. A method performed by a Non-Volatile Memory express (NVMe) controller of a client device, the method comprising:
executing an Operating System (OS);
receiving, by the NVMe controller, a command from a processor of the client device to access data in a shared cache that forms part of a distributed cache on a network, the shared cache located in at least one memory of the client device,
wherein one or more other devices on the network is each configured to provide a respective shared cache for the distributed cache; and
in response to receiving the command, executing a program by the NVMe controller to use data read from the shared cache or data to be written to the shared cache to perform at least one computational operation in a kernel space of the OS.

* * * * *